United States Patent
Sanchez

(10) Patent No.: US 7,633,233 B2
(45) Date of Patent: Dec. 15, 2009

(54) DIGITAL CONTROL SYSTEM FOR LCD BACKLIGHTS

(76) Inventor: Jorge Sanchez, 15655 Oakstand Rd., Poway, CA (US) 92117

( * ) Notice: Subject to any disclaimer, the term of this patent is extended or adjusted under 35 U.S.C. 154(b) by 382 days.

(21) Appl. No.: 10/545,097

(22) PCT Filed: Feb. 6, 2004

(86) PCT No.: PCT/US2004/003400
§ 371 (c)(1),
(2), (4) Date: Aug. 8, 2005

(87) PCT Pub. No.: WO2004/072733
PCT Pub. Date: Aug. 26, 2004

(65) Prior Publication Data
US 2006/0049959 A1 Mar. 9, 2006

(51) Int. Cl.
*G09G 37/00* (2006.01)
*G09G 5/00* (2006.01)
(52) U.S. Cl. .................. 315/169.3; 345/204
(58) Field of Classification Search .......... 315/169.1, 315/169.3, 169.4, 291, 209 PZ, 307; 345/204, 345/205, 76, 77, 78, 84, 102
See application file for complete search history.

(56) References Cited

U.S. PATENT DOCUMENTS

| | | | | |
|---|---|---|---|---|
| 6,078,361 | A * | 6/2000 | Reddy | 348/558 |
| 6,198,234 | B1 * | 3/2001 | Henry | 315/291 |
| 6,445,143 | B1 * | 9/2002 | Min | 315/307 |
| 6,717,374 | B2 * | 4/2004 | Krummel | 315/291 |
| 6,771,029 | B2 * | 8/2004 | Ribarich et al. | 315/292 |
| 6,825,927 | B2 * | 11/2004 | Goldman et al. | 356/317 |
| 2002/0097004 | A1 | 7/2002 | Chiang et al. | |
| 2002/0130786 | A1 * | 9/2002 | Weindorf | 340/815.45 |
| 2002/0169902 | A1 | 11/2002 | Horiuchi et al. | |
| 2003/0160574 | A1 * | 8/2003 | Gray | 315/291 |
| 2003/0218891 | A1 * | 11/2003 | Liu | 363/56.03 |
| 2004/0046535 | A1 * | 3/2004 | Duffy et al. | 323/283 |

FOREIGN PATENT DOCUMENTS

| | | | |
|---|---|---|---|
| EP | 0 923 067 A | 6/1999 | |
| EP | 1 077 444 A | 2/2001 | |

OTHER PUBLICATIONS

International Search Report for PCT/US2004/03400 for publication; Dated Jun. 28, 2004.

* cited by examiner

*Primary Examiner*—Douglas W Owens
*Assistant Examiner*—Minh D A
(74) *Attorney, Agent, or Firm*—Schwabe, Williamson & Wyatt, P.C.

(57) ABSTRACT

Present invention provides an apparatus and a method for digital control of a backlight system in an LCD display. More specifically, the system utilizes a control system in embedded firmware and a mixed signal micro controller unit (MCU) to allow servo digital control of the operation of the backlight system. The MCU provides multiple input and output ports. The ports operate digital and analog signals, which connect a processor to the backlight system and allow the processor to operate the functions of the inverter and the lamps. The embedded firmware control implements digital servo functions and several algorithms used to precisely and automatically set lamp operation, control individual lamps, compensate for aging, perform diagnostics, optimize power consumption and automate manufacturing tests.

8 Claims, 5 Drawing Sheets

DIGITAL CONTROL SYSTEM FOR LCD BACKLIGHTS

This application is a 371 of PCT/US04/03400 Feb. 6, 2004.

BACKGROUND

1. Field of the Invention

The invention relates to a control system, a set of circuits and methods used to control fluorescent lamps used to provide backlight in Liquid Crystal Displays (LCD). The control of the lamps is carried out with a micro controller unit (MCU), which allows the implementation of a digital control system. The digital control system allows multiple lamps to be driven out of the same inverter circuit while preserving the independent light intensity and dimming for each lamp. The digital control system is adaptive and compensates for effects such as aging, operating temperature and lamp variations. The result is equalized lamp brightness for LCD displays. The improved performance is beneficial for displays that require multiple lamps and where all lamps must produce even intensity such as in Television application or high-resolution computer displays.

2. Description of the Related Art

A typical inverter and lamp circuit (100) is shown in FIG. 1. Then inverter is contained in a Printed Circuit Assembly (PCA). The PCA contains analog circuits consisting of a Mosfet switch (101), a coil (102), a push-pull driver circuit (103), a tuning capacitor (104), a transformer (105) and a ballast capacitor (106). The function of the analog circuits in the inverter is to convert a DC voltage input (114) into an AC voltage (115) at the output. The inverter is connected to a lamp circuit consisting of a fluorescent lamp (109), a potentiometer (110) a resistor (111) and a rectifier diode (112). The lamp (109) can be a Cold Cathode Fluorescent Lamp (CCFL). A terminal of the potentiometer (110) is connected to a feedback circuit (108). This circuit senses a half wave rectified voltage generated across the potentiometer (110) and the resistor (111) and sends the voltage to an inverter controller (107). The controller (107) internally contains an analog circuit, which compares the sensed signal from the feedback circuit (108) to an internal reference and as a result generates a pulse width modulated signal (PWM) which then switches the Mosfet (101) on and off in the appropriate manner in order to produce the required AC (115) needed to drive the lamp (109). The controller also has another analog circuit, which allows for the PWM to build a relatively large AC voltage (115) when you first power up the system. The large voltage produced upon power up is needed to produce the initial voltage (Strike Voltage) required to ionize the gas in the lamp as required to initiate fluorescence. Once the lamp turns on, the voltage applied to the lamp can be reduced. The potentiometer (110) is used to adjust the brightness of the lamp in order to account for component variations in manufacturing. A separate dimming voltage (113) is connected to the internal comparator in the inverter controller (107). The dimming voltage 113 is added to the signal from the lamp current feedback circuit (108), which results in a change of the PWM and a change in the lamp (107) brightness.

The use of the inverter controller (107) results in analog control of the inverter and lamp circuits. Some disadvantages of the analog control include:

1. Requires manual adjustment of potentiometer (110) to compensate for component variations
2. Does not compensate for aging of the lamp (109) since an aging lamp will produce less light intensity for the same amount of current
3. The control system is not adaptable to changes in temperature As an example of the limitations in current systems consider the backlight assembly in FIG. 2. The drawing represents a backlighting assembly for a large LCD screen system (200). The large screen may be LCD technology. Large screens require numerous CCFLs. Current approaches to the lighting assembly basically multiply the entire assembly in FIG. 1 (100). As can be appreciated form the large screen system (200), each inverter and lamp circuit requires individual manual adjustments and multiple inverter circuits. The multiple inverters are needed in order to allow individual adjustment for the current in each lamp. Adjusting the current in a lamp changes the amount of light intensity. In many applications uniformity of light across the display panel is required to obtain high picture quality. This implementation adds weight especially because the numerous transformers used. The large screen system (200) does not have a way to equalize the light from the lamps since each inverter is independent from each other. The entire solution is costly, heavy, requires large amounts of manual labor and lamp light intensity is uneven. Also, as the lamps age, there is no way to compensate for the decrease in light intensity.

SUMMARY OF THE INVENTION

The invention consists of an apparatus and a method of operation used in a digital control system for an LCD backlight assembly. The apparatus consists of a Microcontroller unit (MCU) with pulse width modulators (PWMs), an Analog to Digital Converter and other support circuits. The apparatus includes a current control circuit. The process consists of embedded digital control software in the MCU, The invention provides the numerous advantages obtained with a digital control system. Settings for lamp intensity are automated and since they are entered in firmware the settings are not sensitive to component variations or temperature. The control system can compensate for lamp aging and temperature changes.

Another advantage of the present invention is that the inverter and lamp system can be made to operate efficiently since the operation can automatically adapt to varying requirements, which translate in the need for different voltages to be applied to the lamps.

Yet another advantage of the invention is to reduce the cost and power consumption of a backlight system

BRIEF DESCRIPTION OF THE DRAWINGS

Details of the invention, and of the preferred embodiment thereof will be further understood upon reference to the drawings.

DETAILED DESCRIPTION OF AN EMBODIMENT

Apparatus.

Figure 1:
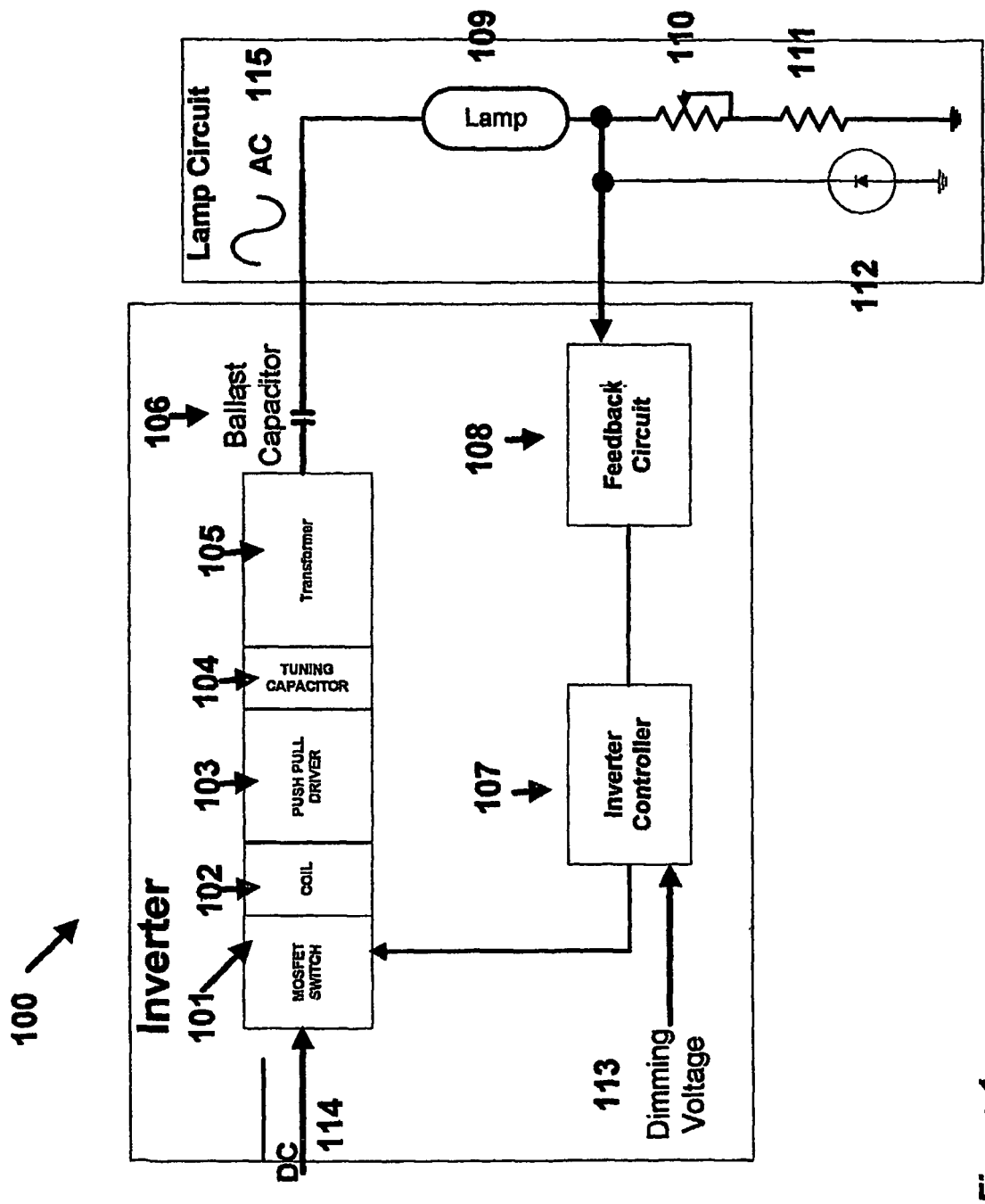
FIG. 1 is a typical inverter and lamp circuit (100).
Figure 2:
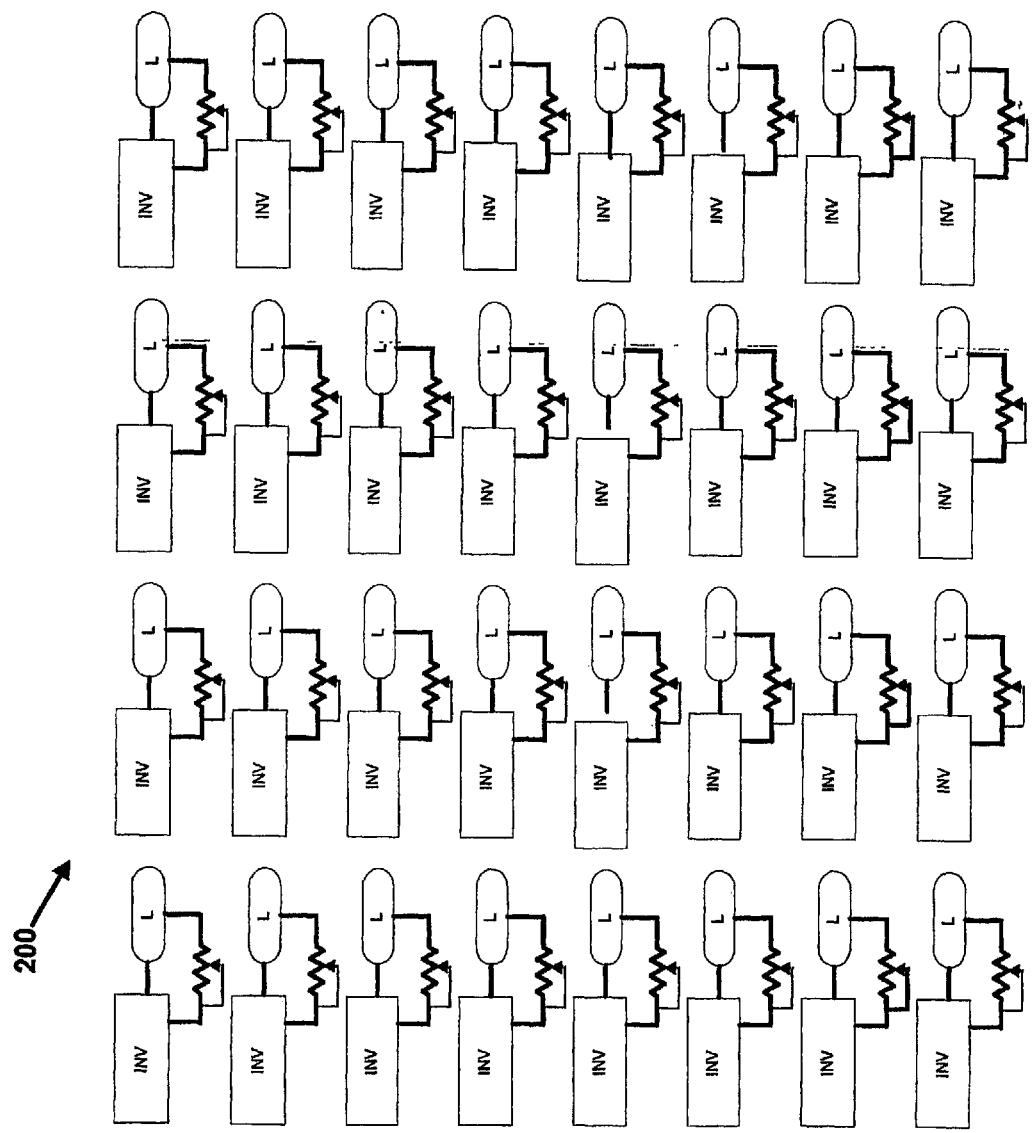
FIG. 2 shows backlighting for a large LCD screen system (200).
Figure 3:
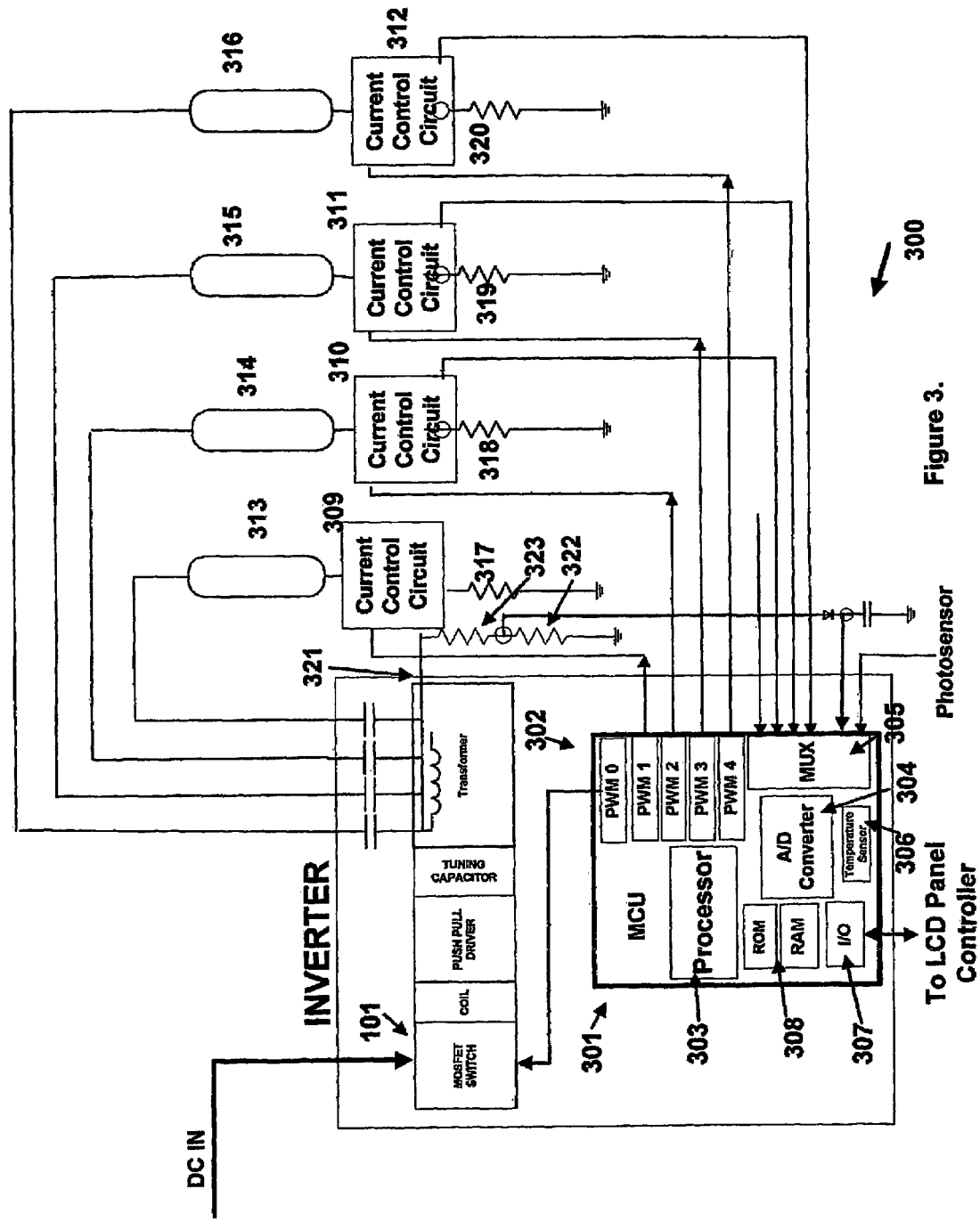
FIG. 3 shows an embodiment of the apparatus of the present invention (300).

An embodiment of the digital control system is shown in FIG. 3. The system is shown driving 4 fluorescent lamps, however the concept can be expanded to many more lamps. The inverter controller (101) has been substituted with an MCU (301). The MCU contains Pulse width modulators (302), a processor (303), an A/D converter (304), an analog multiplexer (305), a temperature sensor (306), an I/O (307) used to communicate with a host computer or LCD controller, ROM and RAM (308). The MCU (302) is a mixed-signal Integrated Circuit that includes an analog Multiplexer (305) and an A/D converter (304).

In addition, the apparatus contains Current Control Circuits (309-312) used to control the AC current flowing through the lamps (313-316). These circuits contain a set of passive and active components. The circuits are switched under the control of the MCU (301), in a manner that will change the overall lamp circuit impedance. A change in the overall lamp circuit impedance will cause a change in the lamp current. A second way in which the Current Control Circuits (309-312) are operated is to utilize a PWM signal to continually switch the circuits on and off at a given duty cycle. The PWMs (302) switch with a frequency that is much lower than the frequency of the AC signal (321). Typically the AC (302) will be in the range of 50 KHz. The PWM for each lamp will switch at frequencies ranging from approximately 100 Hz to frequencies in the several kilohertz. The lower repetition rate for the PWM is set to avoid visual flicker of the lamp.

The duty cycle of the PWM will determine the impedance characteristics of the circuit. In addition, resistors (317-320) are used to sense the current through each lamp. The magnitude of the secondary voltage at (321) is determined by the embedded code in the MCU (302). The voltage sense resistors (322, 323) provide the necessary feedback used by the control system to set the secondary voltage. The apparatus is capable of performing all of the functions of a traditional analog controller. In addition the apparatus can provide multiple sensor inputs and multiple digital and analog outputs. These analog and digital inputs and outputs support the means by which a digital control system can actuate on the backlight system.

Methods.

Figure 4:
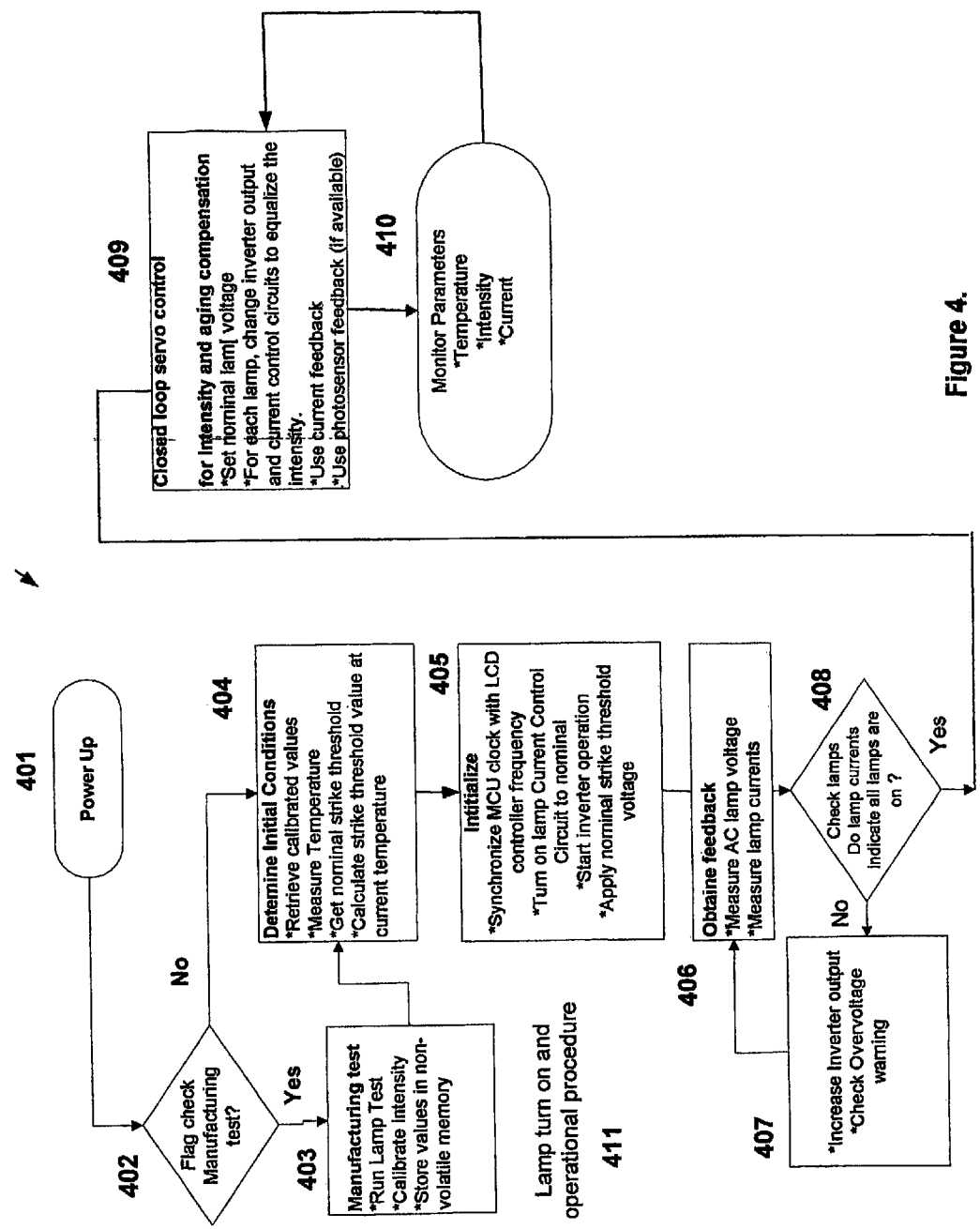
FIG. 4 illustrates an embodiment of the methods used in the digital control system (400).

An embodiment of the method of operation is exemplified in FIG. 4. The control process (400) is initiated with a power up condition (401). In the next step the system checks for a flag condition. If a flag contained in the firmware is set it indicates that a Manufacturing test (402) is to be performed. The I/O (307) can set the flag. If a Manufacturing test is performed then the firmware proceeds to perform the Lamp test and the calibration of the intensity for the lamp. In addition, several additional parameters are entered in the code, which determine the specific characteristics of the backlight system. If the flag is reset or if the Manufacturing test is complete, the system then proceeds to determine initial conditions (404). Initial conditions are determined by an initial measurement of temperature and a calculation of the strike voltage corresponding to the present temperature and type of lamp. Calibrated values needed to control the specific backlight system are retrieved from non-volatile memory.

The lamp turn on and operational procedure (411) consists of several steps:
a) As part of initialize, (405), the inverter clock is synchronized to the LCD controller clock
b) Current control circuits (309-312) are set to the nominal value
c) Inverter is started with the application of nominal strike voltage
d) Feedback is obtained (406)
e) Check lamps 408 verifies if all lamps are turned on
f) If all lamps are still not on, the inverter output is increased at 407 which an over-voltage check is performed g) Once the lamps are turned on the Servo Control is activated at 409. The lamp current, voltage and light intensity are maintained as determined by the servo algorithm and the feedback signals.
h) At (410) lamps parameters are monitored for continuous feedback and appropriate action
i) Servo control is continually active.

Figure 5:
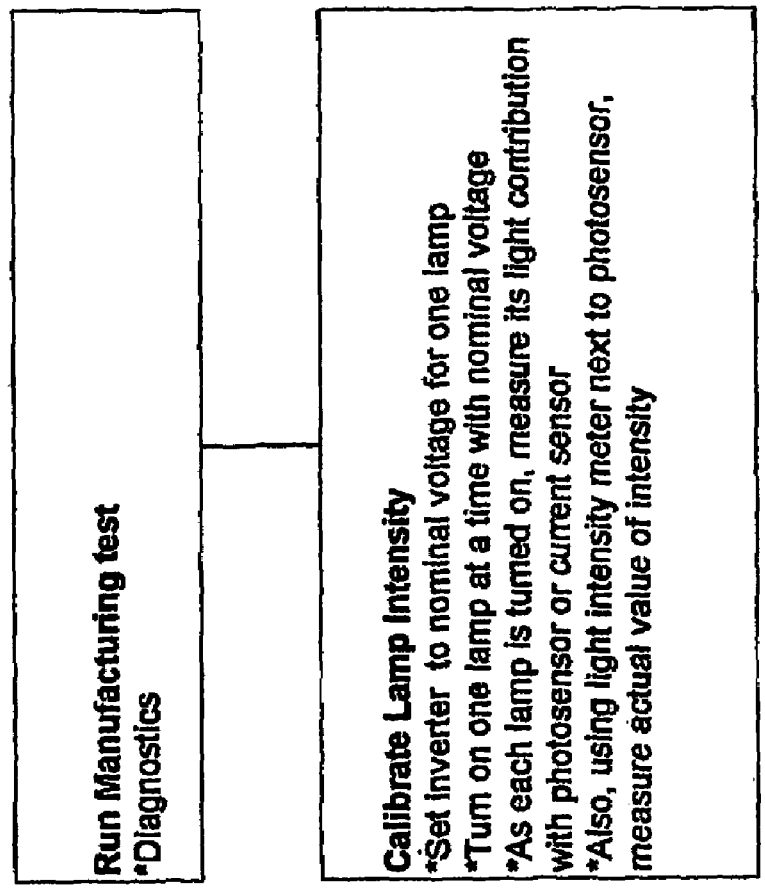
FIG. 5 shows the manufacturing test and the calibration of lamp intensity (500).

An illustration of the calibration is shown in FIG. 5. The process is as follows
a) The inverter is set to a nominal value for one lamp
b) One lamp is turned on at a time
c) Measurements of current voltage and emitted light are made automatically and recorded for calibration purposes.

Other embodiments of the apparatus and methods described above can be applied to other lighting systems consisting of other types of light emitting devices such as LEDs EEFL lights and plasma display systems.

What is claimed is:

1. An apparatus, comprising:
an inverter configured to generate a secondary voltage, wherein the secondary voltage is generated, by a switch configured to convert a direct current input into an analog current output;
a multiplexer coupled to the inverter and configured to receive a feedback signal sensed from the secondary voltage;
an analog-to-digital converter coupled to the multiplexer and configured to convert the feedback signal into a digital feedback signal; and
a pulse width modulator coupled to the analog-to-digital converter and configured to drive the switch with a pulse width modulated signal based, on the digital feedback signal, wherein the pulse width modulated signal is configured to control the secondary voltage, wherein the pulse width modulator is further configured to provide a pulse width modulated signal to one or more lamp control circuits, wherein the pulse width modulated signal is switched on and off at a determined duty cycle to alter an impedance of the one or more lamp control circuits.

2. The apparatus of claim 1, further comprising a voltage sense resistor coupled to both the inverter and the multiplexer and configured to sense a magnitude of the secondary voltage and provide the feedback signal.

3. A method, comprising:
generating a secondary voltage at an output of an inverter, wherein the secondary voltage is generated by switching a direct current through a switch to convert the direct current into an alternating current;
receiving, a feedback signal sensed from the secondary voltage;
multiplexing, the feedback signal in an analog multiplexer;
converting, the multiplexed feedback signal into a digital feedback signal via an A/D converter; and
driving the switch with a pulse width modulated signal in response to the digital feedback signal to control said generating;
driving one or more luminescent devices with a current based on the secondary voltage generated at the output of the inverter.

4. The method of claim 3, further comprising measuring light output from the one or more luminescent devices to determine if the one or more luminescent devices are turned on.

5. The method of claim 4, wherein said measuring comprises receiving a current feedback signal from the one or more luminescent devices, and wherein the current feedback signal is used to determine the light output.

6. The method of claim 4, wherein said measuring comprises receiving a light output signal from a photosensor, and wherein the light output signal is used to determine the light output.

7. The method of claim 3, further comprising controlling the current through the one or more luminescent devices by changing an impedance of the one or more luminescent devices.

8. The method of claim 3, further comprising compensating for degradation of the one or more luminescent devices by adjusting the secondary voltage.

* * * * *

UNITED STATES PATENT AND TRADEMARK OFFICE
CERTIFICATE OF CORRECTION

| | | |
|---|---|---|
| PATENT NO. | : 7,633,233 B2 | Page 1 of 1 |
| APPLICATION NO. | : 10/545097 | |
| DATED | : December 15, 2009 | |
| INVENTOR(S) | : Jorge Sanchez | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 400 days.

Signed and Sealed this

Second Day of November, 2010

David J. Kappos
*Director of the United States Patent and Trademark Office*